US007856298B2

(12) United States Patent
Raichle et al.

(10) Patent No.: US 7,856,298 B2

(45) **Date of Patent: *Dec. 21, 2010**

(54) ADAPTIVE DIAGNOSTIC CABLE

(75) Inventors: Kurt Raichle, Owatonna, MN (US); Durval Ribeiro, Owatonna, MN (US); Garret Miller, Owatonna, MN (US)

(73) Assignee: SPX Corporation, Charlotte, NC (US)

( * ) Notice: Subject to any disclaimer, the term of this patent is extended or adjusted under 35 U.S.C. 154(b) by 489 days.

This patent is subject to a terminal disclaimer.

(21) Appl. No.: 11/976,662

(22) Filed: Oct. 26, 2007

(65) Prior Publication Data

US 2008/0103653 A1 May 1, 2008

Related U.S. Application Data

(60) Provisional application No. 60/854,719, filed on Oct. 27, 2006.

(51) Int. Cl.
*G01M 17/00* (2006.01)

(52) U.S. Cl. ........................................................ 701/29

(58) Field of Classification Search .............. 701/29–34
See application file for complete search history.

(56) References Cited

U.S. PATENT DOCUMENTS

| | | | | |
|---|---|---|---|---|
| 5,442,170 | A | 8/1995 | Kreft et al. | 250/229 |
| 5,491,418 | A * | 2/1996 | Alfaro et al. | 324/402 |
| 5,555,498 | A | 9/1996 | Berra et al. | 364/424.03 |
| 5,737,711 | A | 4/1998 | Abe | 701/29 |
| 6,236,917 | B1 | 5/2001 | Liebl et al. | 701/29 |
| 6,282,469 | B1 | 8/2001 | Rogers et al. | 701/29 |
| 6,526,340 | B1 | 2/2003 | Reul et al. | 701/29 |
| 6,701,233 | B2 | 3/2004 | Namaky et al. | 701/33 |
| 6,816,760 | B1 | 11/2004 | Namaky | 701/29 |
| 6,874,680 | B1 | 4/2005 | Klaus et al. | 235/375 |
| 6,928,349 | B1 | 8/2005 | Namaky et al. | 701/33 |
| 7,105,741 | B2 | 9/2006 | Banar et al. | 174/50 |
| 7,248,954 | B2 | 7/2007 | Chinnadurai et al. | 701/29 |
| 7,305,289 | B2 | 12/2007 | Gessner et al. | 701/33 |
| 2005/0182535 | A1 | 8/2005 | Huang | 701/29 |
| 2006/0041347 | A1 | 2/2006 | Chinnadurai et al. | 701/35 |
| 2006/0041348 | A1 | 2/2006 | Liebl et al. | 701/35 |
| 2006/0041349 | A1 | 2/2006 | Chinnadurai et al. | 701/35 |
| 2006/0101311 | A1 | 5/2006 | Lipscomb et al. | 714/47 |

* cited by examiner

*Primary Examiner*—Kim T Nguyen
(74) *Attorney, Agent, or Firm*—Baker & Hostetler LLP

(57) ABSTRACT

An apparatus and method are provided that allow a scan tool to communicate with a data link connector in a vehicle. A cable that can automatically multiplex its connections in order to make the appropriate connections between the scan tool and a data link connector based on a communication protocol of the vehicle under test. This allows the scan tool to communicate with the data link connector regardless of the pins being used by the communication protocol of the vehicle.

20 Claims, 5 Drawing Sheets

ADAPTIVE DIAGNOSTIC CABLE

CROSS-REFERENCE TO RELATED APPLICATIONS

This application claims priority to provisional U.S. patent application entitled, "Adaptive Diagnostic Cable," filed Oct. 27, 2006, having Ser. No. 60/854,719, the disclosure of which is hereby incorporated by reference in its entirety.

FIELD OF THE INVENTION

The present invention relates generally to a diagnostic cable. More particularly, the present invention relates to a multiplexing diagnostic cable for use with a vehicle diagnostic tool.

BACKGROUND OF THE INVENTION

Modern vehicles typically have one or more diagnostic systems, generally having separate computer control modules or electronic control units (ECUs) to control various functions of the vehicle. Some examples include powertrain control module (PCM), engine control module (ECM), transmission control module (TCM), anti-locking brake system (ABS), and an air bag control module. The vehicle diagnostic systems often have self-diagnostic capability to detect and alert the driver of problems the vehicle may be encountering. When a problem is found, a diagnostic trouble code or DTC, is set within the computer's memory. DTCs are as general or as specific as the manufacturer desires.

To retrieve and decipher DTCs, an auto repair technician needs a diagnostic tool, such as a scan tool. The scan tool must, therefore, be connected to the vehicle's data link connector (DLC) to access and retrieve the DTCs. Scan tools are testing devices that interface with the vehicle's diagnostic systems to retrieve information from the various control modules. The scan tools are equipped to communicate in various communication protocols such as Controlled Area Network (CAN), J1850 VPM and PWM, ISO 9141, Keyword 2000 and others. These communications protocols are specific to the various automobile manufacturers.

A cable is used to interface the scan tool with the DLC. Although the DLC typically is a J1960 type connector having 16 pins for various communications, controls and measurements, the use of the different pins for different functions varies between the different modules in the vehicle and can also vary with different manufactures of the vehicles. Thus, a maintenance garage would need to carry different cables configured for the various pin configurations and communication protocols used by various vehicle manufacturers. Additionally, the garages can carry different "keys" or smart system interface (SSI) that can be individually configured for a certain vehicle or communication protocol. These solutions are problematic in that they require the garage to carry various cables or keys for the various vehicles being serviced and require the technician to know which cable or key goes with which vehicle under service. Additionally, the cables and keys can get lost because there are so many to keep track of in the garage.

The J1962 connector also supplies the ground signal to the scan tool so that the scan tool can use that as a reference signal. Without a good ground signal, the measurements received by the scan tool may not be accurate. The ground signal can be from a chassis ground or from a signal ground. However, some vehicles do not supply both so that receiving a reference signal can be difficult.

Accordingly, it is desirable to provide an adaptive cable that is configurable between a diagnostic scan tool and a DLC. It is also desirable to provide the adaptive cable with a relay that can switch from a signal ground to a chassis ground or vice versa depending on which ground is available in order to for the scan tool to record accurate measurements.

SUMMARY OF THE INVENTION

The foregoing needs are met, to a great extent, by the present invention, wherein in one aspect an apparatus is provided that in some embodiments can provide automatic multiplexing capabilities to a cable that connects a scan tool to a DLC of a vehicle.

In accordance with one embodiment of the invention, an adaptive cable for use with a vehicle diagnostic tool is provided, which comprises a complex programmable logic device adapted to receive instructions from the vehicle diagnostic tool, a first multiplexer adapted to receive instructions from the complex programmable logic device to configure its connections for a vehicle communication protocol, a first cable to connect the adaptive cable to the vehicle diagnostic tool, a second cable to connect to a data link connector in a vehicle, a communication protocol module that communicates in various communication protocols and communicates with the multiplexer, and a housing that houses the multiplexer, a portion of the first cable, a portion of the second cable, the communication protocol module and the complex programmable logic device.

In accordance with another embodiment of the invention, a method of providing communication between a vehicle diagnostic tool and a vehicle data link connector is provided and can include receiving communication protocol instructions from the vehicle diagnostic tool to a complex programmable logic device via a first cable, sending configuration instructions from the complex programmable logic device to a first multiplexer, wherein the multiplexer configures its connectors based on the communication protocol of a vehicle under test, and providing communication between the vehicle diagnostic tool and the vehicle data link connector with a communication protocol module, and the multiplexer via a second cable connected to the vehicle data link connector.

In accordance with yet another embodiment of the invention, an adaptive cable for use with a vehicle diagnostic tool is provided, which comprises a means for processing to receive instructions from the vehicle diagnostic tool, a first means for multiplexing to receive instructions from the means for processing to configure its connections for a vehicle communication protocol, a first means for transmitting to connect the adaptive cable to the vehicle diagnostic tool, a second means for transmitting to connect the adaptive cable to a data link connector in a vehicle, a means for communicating in various communication protocols and communicates with the first means for multiplexing, and a means for housing the first means for multiplexing, a portion of the first means for transmitting, a portion of the second means for transmitting, the means for communicating and the means for processing.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
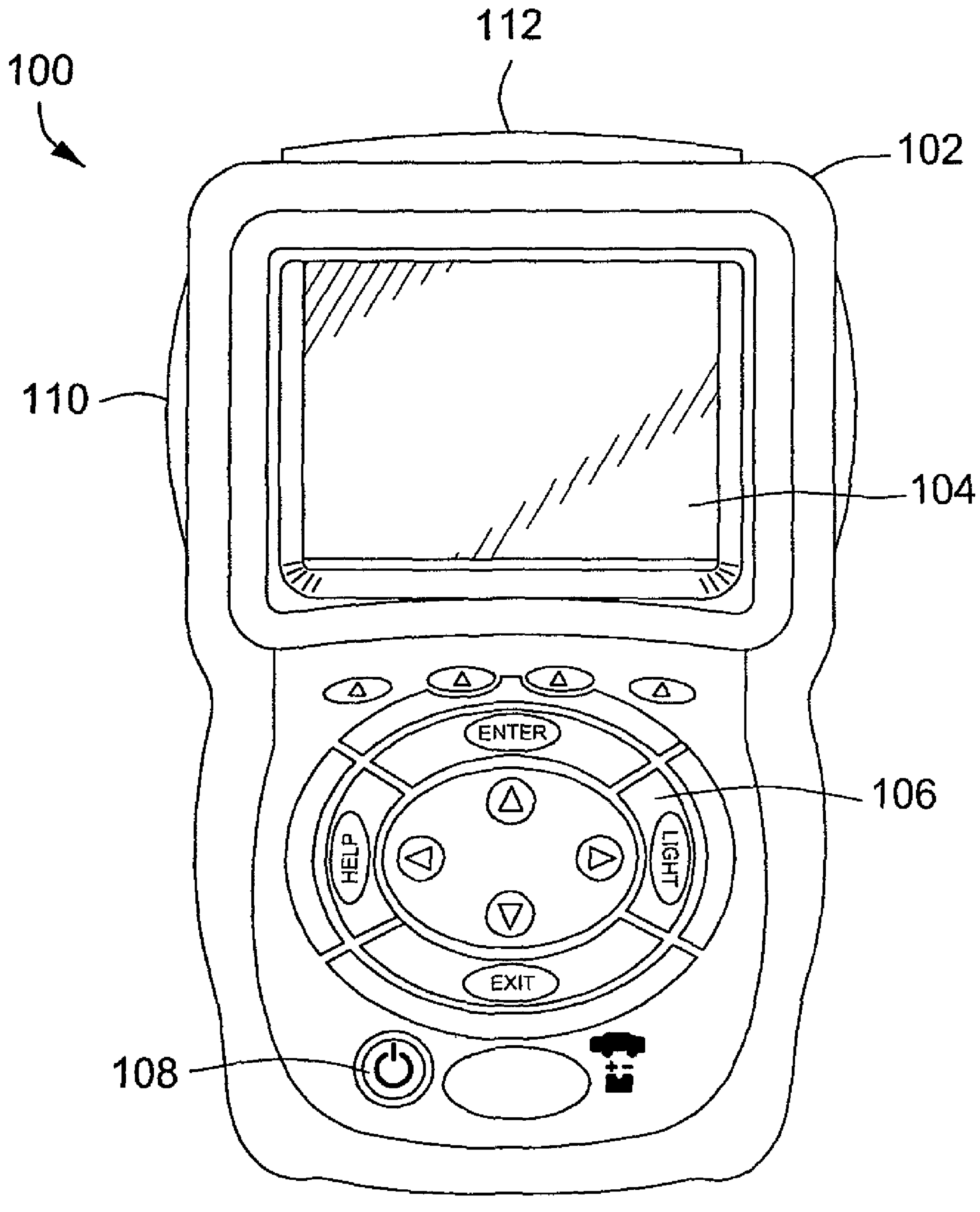
FIG. 1 is a front view of a scan tool that can be connected to the adaptive cable described below.

The invention will now be described with reference to the drawing figures, in which like reference numerals refer to like parts throughout. An embodiment in accordance with the present invention provides an adaptive cable and method that allow a scan tool to communicate with a DLC of a vehicle regardless of the communication protocols and the pin connections being used by the vehicle.

FIG. 1 is a front view of an exemplary scan tool 100 that can be connected to the adaptive cable described below. The scan tool 100 can be any computing device, such as, for example, the Nemisys™ scan tool from Service Solutions (a unit of the SPX Corporation) in Owatonna, Minn. The scan tool 100 includes a housing 102 to house the various components (see also FIG. 2) of the scan tool, such as a display 104, a user interface 106, a power key 108, a memory card reader 110 and a connector interface 112. The display 104 can be any display, for example, LCD (liquid crystal display), VGA (video graphics array), touch display (can also be as a user interface), etc. The user interface 106 allows the user to interact with the scan tool in order to operate the scan tool as desired. The user interface 106 can include function keys, arrow keys or any other type of keys that can manipulate the scan tool 100 in order to operate various menus that are presented on the display. The input device 106 can also be a mouse or any other suitable input device, including a keypad. The user interface 106 can also include numbers or be alphanumeric. The power key 108 allows the user to turn the scan tool 100 on and off, as required.

Memory card reader 110 can be a single type card reader, such as a compact flash card, floppy disc, memory stick, secure digital, other types of flash memory or other types of memory. The memory card reader 110 can be a reader that reads more than one of the aforementioned memory such as a combination memory card reader. Additionally, the card reader 110 can also read any other computer readable medium, such as CD, DVD, UMD, etc.

The connector interface 112 allows the scan tool 100 to connect to an external device, such as an ECU (electronic control unit) of a vehicle through the adaptive cable described herein, a computing device, an external communication device (such as a modem), a network, etc. through a wired or wireless connection. Connector interface 112 can also include a USB, FIREWIRE, modem, RS232, RS48J, and other connections to communicate with external devices, such as a hard drive, USB flash memory device, CD player, DVD player, UMD player or other computer readable medium devices.

Figure 2:
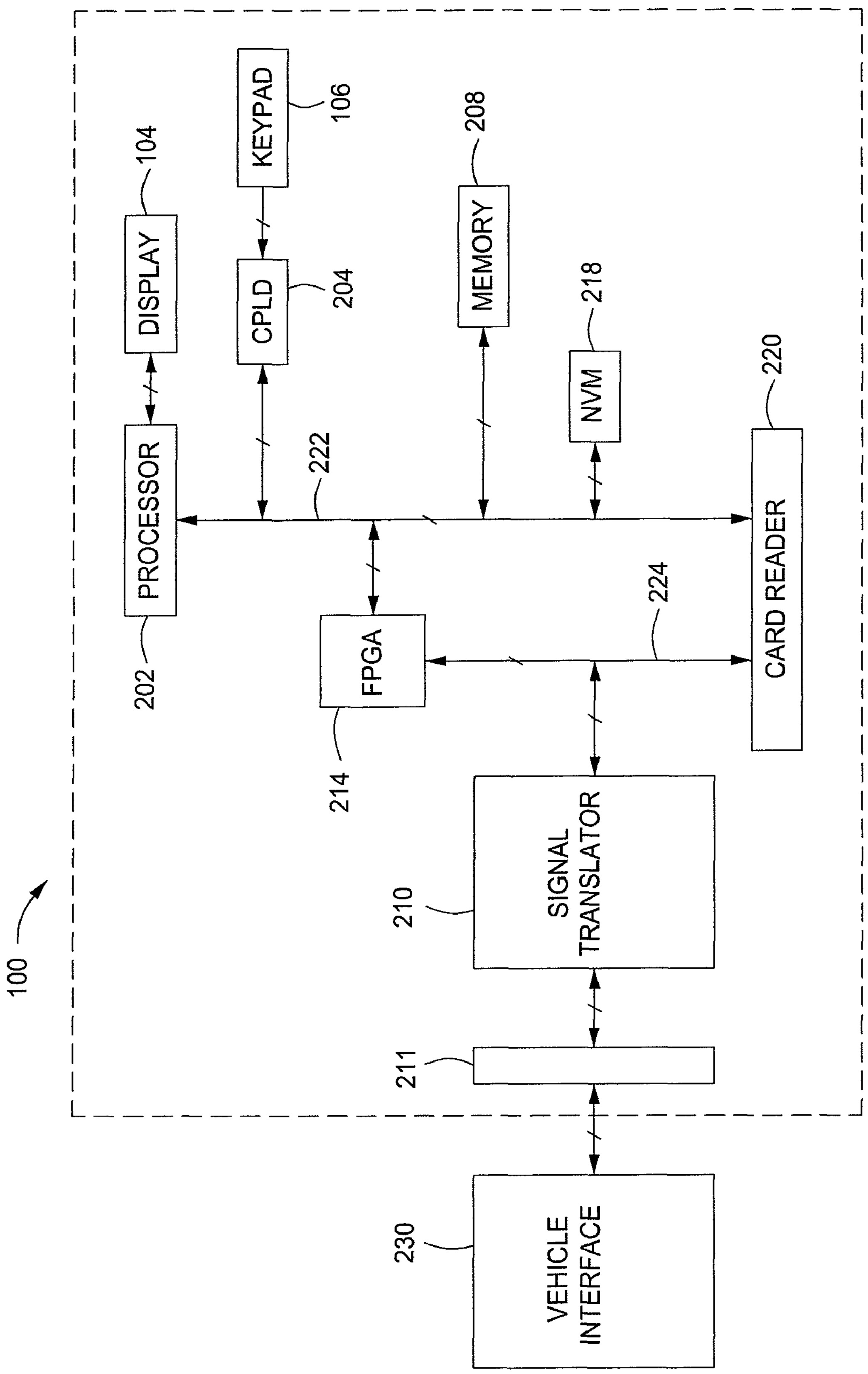
FIG. 2 is a block diagram of the components of the scan tool of FIG. 1.

FIG. 2 is a block diagram of the components of the scan tool 100. In FIG. 2, the scan tool 100 according to an embodiment of the invention includes a processor 202, a field programmable gate array (FPGA) 214, a first system bus 224, the display 104, a complex programmable logic device (CPLD) 204, the user interface in the form of a keypad 106, a memory subsystem 208, an internal non-volatile memory 218, a card reader 220, a second system bus 222, a connector interface 211, and a selectable signal translator 210. A vehicle communication interface 230 is in communication with the scan tool 100 through connector interface 211 via an external cable (not shown), such as the adapter cable.

Selectable signal translator 210 communicates with the vehicle communication interface 230 through the connector interface 211. Signal translator 210 conditions signals received from an ECU unit through the vehicle communication interface 230 to a conditioned signal compatible with scan tool 100. Signal translator 210 can communicate with, for example, the following communication protocols: J1850 (VPM and PWM), ISO 9141-2 signal, communication collision detection (CCD) (e.g., Chrysler collision detection), data communication links (DCL), serial communication interface (SCI), S/F codes, a solenoid drive, J1708, RS232, Controller Area Network (CAN), Keyword 2000 (ISO 14230-4) or other communication protocols that are implemented in a vehicle.

The circuitry to translate and send in a particular communication protocol can be selected by FPGA 214. Signal translator 210 is also coupled to FPGA 214 and the card reader 220 via the first system bus 224. FPGA 214 transmits to and receives signals (i.e., messages) from the ECU unit through signal translator 210.

The FPGA 214 is coupled to the processor 202 through various address, data and control lines by the second system bus 222. FPGA 214 is also coupled to the card reader 220 through the first system bus 224. The processor 202 is also coupled to the display 104 in order to output the desired information to the user. The processor 202 communicates with the CPLD 204 through the second system bus 222. Additionally, the processor 202 is programmed to receive input from the user through the user interface 106 via the CPLD 204. The CPLD 204 provides logic for decoding various inputs from the user of scan tool 100 and also provides glue-logic for various other interfacing tasks.

Memory subsystem 208 and internal non-volatile memory 218 are coupled to the second system bus 222, which allows for communication with the processor 202 and FPGA 214. Memory subsystem 208 can include an application dependent amount of dynamic random access memory (DRAM), a hard drive, and/or read only memory (ROM). Software that operates the basic functions of the scan tool 100 can be stored in the memory subsystem 208, while the software to run the diagnostic functions of the scan tool can be stored on an external memory device, such as a CF (Compact Flash) card.

Internal non-volatile memory 218 can be an electrically erasable programmable read-only memory (EEPROM), flash ROM, or other similar memory. Internal non-volatile memory 218 can provide, for example, storage for boot code, self-diagnostics, various drivers and space for FPGA images, if desired. If less than all of the modules are implemented in FPGA 214, memory 218 can contain downloadable images so that FPGA 214 can be reconfigured for a different group of communication protocols.

The adaptive cable described herein can replace the multiple cables and SSI that are used with the cable connecting the scan tool 100 with the DLC. The adaptive cable, as explained herein, is configured to automatically configure switches and relays via a CPLD to provide the correct connections with the DLC. The adaptive cable can receive an expansion module (discussed below) for future upgrades and additionally functionality. Initially, the expansion module can be configured as being straight-through connection, but can be reconfigured or expanded, as needed. The insert can have printed circuit board (PCB) edge-finger that mates with a PCB within the adaptive cable.

Figure 3:
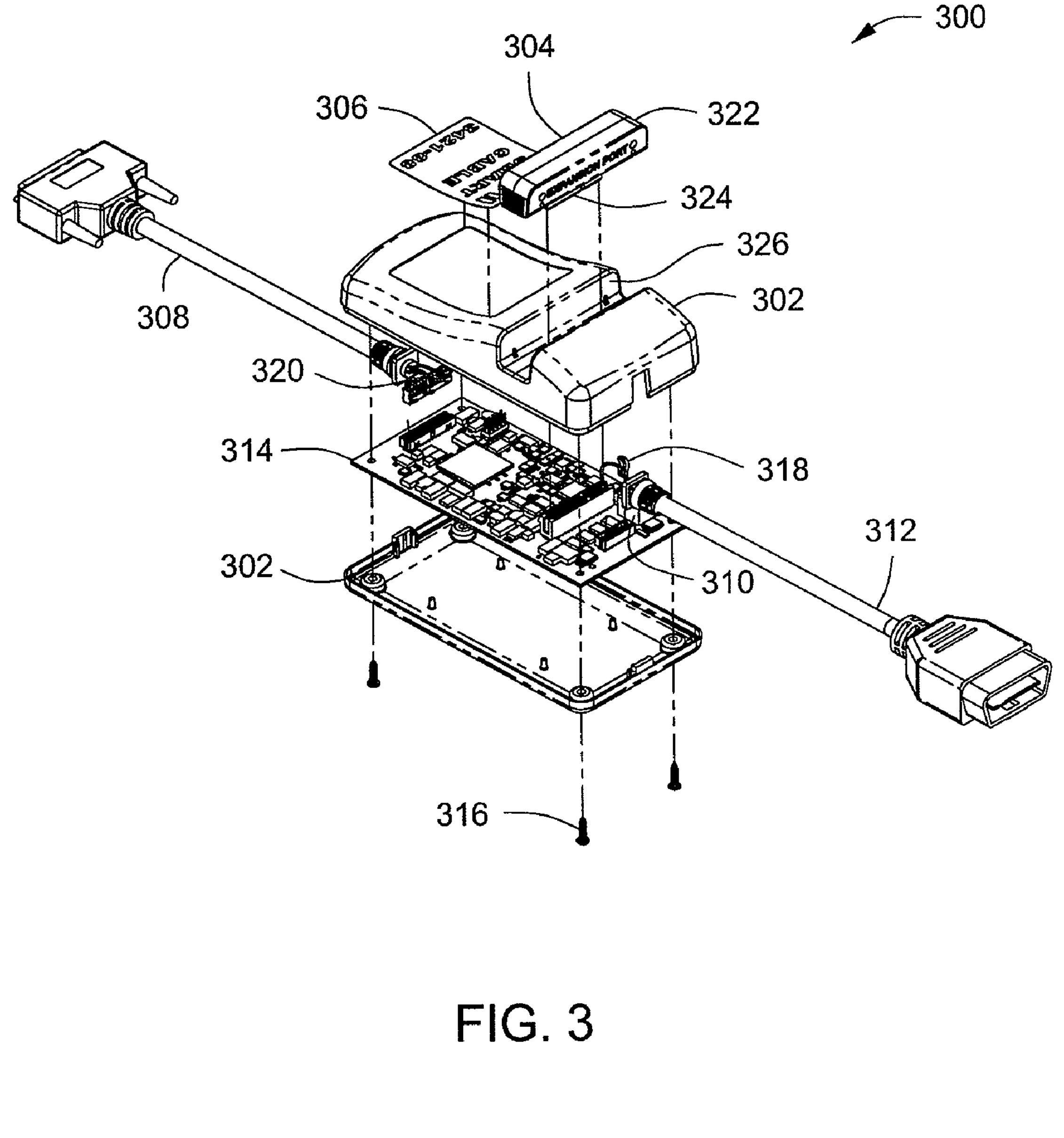
FIG. 3 illustrates an exploded view of an adaptive cable according to an embodiment of the invention.

FIG. 3 illustrates an exploded view of an adaptive cable 300 according to an embodiment of the invention. The adaptive cable includes a housing 302, the expansion module 304, a label 306, a DB25 (male to male) connector 308, a switchable relay 310 (discussed in FIG. 5), a J1962 connector (female) 312, a main PCB 314, and screws 316.

The housing can include a top and bottom portion for easy access to the main PCB, the ends of the J1962 and DB25 connectors and other components. The top and bottom portions of the housing may be coupled together by screws 316 or any other fastening means. The housing can be made from any natural or synthetic materials (ABS). The bottom of the housing includes off-sets on a surface to off-set the main PCB 314 from the bottom surface of the housing.

The housing can receive the expansion module 304 in a recess portion 326 of the housing so that the expansion module fits flush with the housing and connects with the main PCB. The expansion module 304 includes protrusions on the sides so that a user's fingers can better grip the sides of the module. The module has an upper portion 322 and a lower portion 324. The lower portion 324 includes PCB edge-finger to connect with the main PCB 314 and generally has smaller dimensions than the upper portion's dimensions.

The label 306 can be coupled to the housing through glue, tape or others similar means. The label can carry the logo of the company that is offering the adaptive cable 300 or any other information, such as model and serial numbers. The label can be stuck onto a sloping portion of the housing 302.

The DB25 connector 308 includes two ends. One end is designed to mate with the scan tool at its connector interface 112. The second end mates with the housing and the main PCB through a connector 320. The commands from the scan tool can be sent via the DB25 connector to a CPLD 422 (FIG. 4) of the adaptive cable in order to perform the multiplexing through switching of the array of internal FETs (Field Effect Transistors) and relays. The FETs and relays are normally in the off or non-connected condition. The FET can also be the MOSFET type.

The J1962 connector 312 allows the adaptive cable and the scan tool to communicate with the DLC of the vehicle under test. The J1962 connector 312 has a first and second ends. The first end can be connected to the DLC and the second end can be connected to the housing and the main PCB through a connector 318. Power to run the scan tool and the adaptive cable may be drawn from the vehicle's battery through the J1962 connector (Vbat line). In some embodiments, the adaptive cable 300 and the scan tool may be powered by a set of batteries in the scan tool or through other external sources. In other embodiments, the adaptive cable 300 has an internal battery source. Upon powering up, the connections that are active through the J1962 connector are the Vbat line and the ground. The remaining lines are in a high-impedance state until configured by the scan tool.

Figure 4:
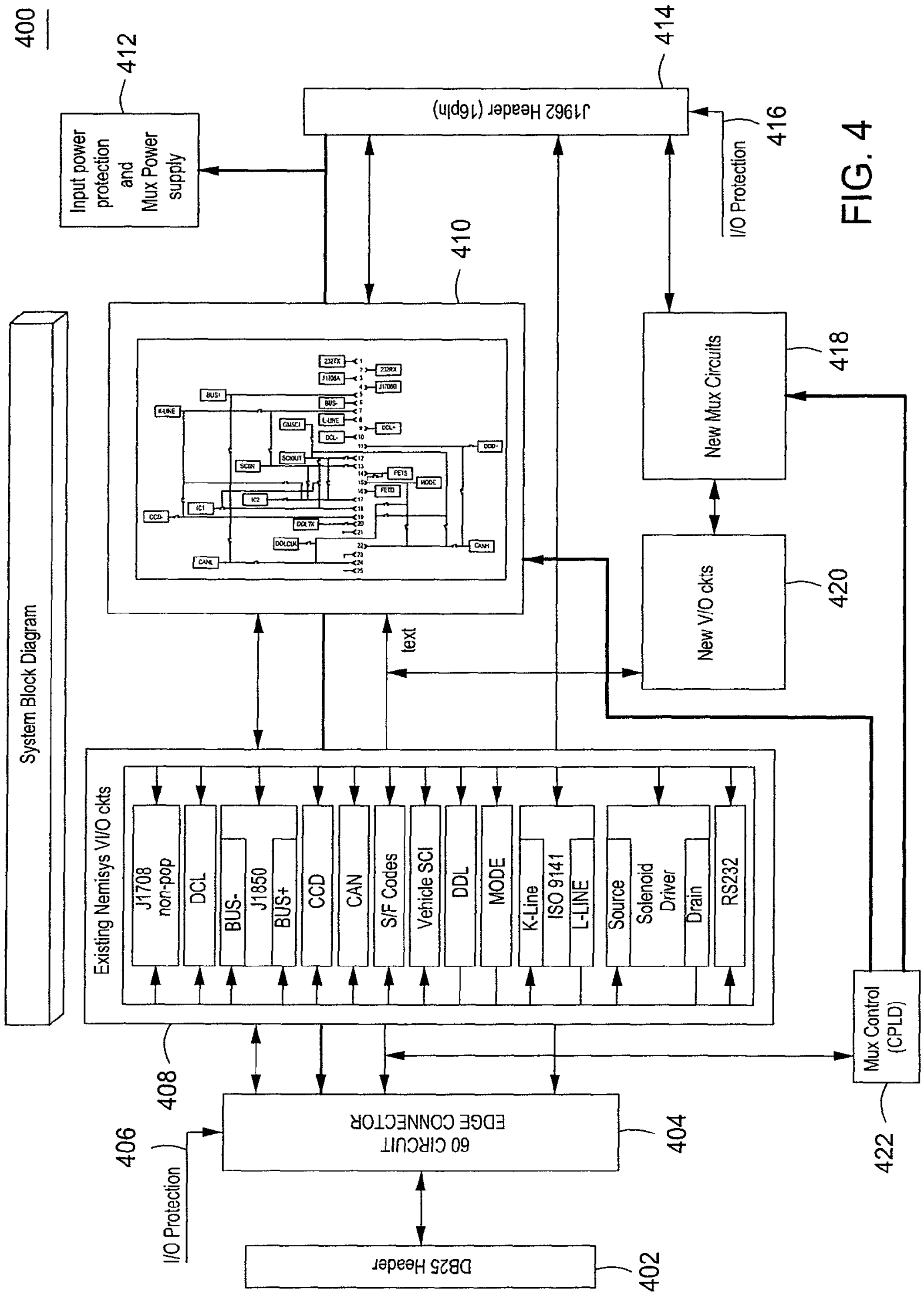
FIG. 4 is a block diagram of components of the adaptive cable of FIG. 3 according to an embodiment of the invention.

FIG. 4 is a block diagram 400 of components of the adaptive cable 300 according to an embodiment of the invention. The block diagram 400 includes a DB25 I/O header 402 to connect the adaptive cable to the scan tool. The block diagram also illustrates the expansion card 404, which is constructed and designed to expand the functionality of the adaptive cable and include a 64-pin edge-finger style connector that mates with the main PCB. The expansion card can include additional FETs, relays, memory, power, processors including FPGA (field programmable gate array), programming access to a CPLD (complex programmable logic device), communication protocol transmitters and receivers, wireless communication, GPS, and other components that can be used to expand the functionality of the adaptive cable and to allow the adaptive cable to communicate in additional communication protocols.

The CPLD 422 provides the communication interface with the scan tool and the control interface for the FETs and relays of a multiplexer 410 to multiplex signals and other various ancillary functions. The communication interface can use the FORD DCL communication lines on the DB25 connector. These communications are bi-directional in nature. The control interface on the CPLD will have individual I/O lines to control individual FET switches.

Communication protocol module 408 contains the communication receivers and transceivers necessary for communicating with the vehicle under the test. The communication protocols can include Controlled Area Network (CAN), J1850 VPM and PWM, ISO 9141, DCL (communication links), S/F codes, a solenoid drive, J1708, 2201, CCD (communication collision detection (e.g., Chrysler collision detection)), Controller Area Network (CAN), SCI (serial communication interface), Keyword 2000 and other communication protocols. The communication protocol module also includes the RS232 serial interface for the scan tool.

The multiplexer 410 includes all the components for it to perform the multiplexing function when instructed by the scan tool. There are 25 pins that can be used with this embodiment of the multiplexer. As noted above, different vehicle manufacturers use different connections (pins) on the J1962 connector and different communication protocols. The multiplexer 410 must be able to make the right connections so that the scan tool can communicate with the ECU based on the communication protocols used and the connections made at the DLC. The connections can be made with the FETs, relays and other components located in the multiplexer 410. For example, for CAN high and low, switches 21 and 10, respectively are switched into place should CAN protocol is being communicated. Using a multiplexing device, the SSI or keys are no longer required to be kept by the garage and allows the adaptive cable to deal with the various communication protocols from various vehicles. Although 25 pins are shown on FIG. 4, additional pins or fewer pins can be configured as needed.

Software in the scan tool has been configured to know which connections on the J1962 connector on the vehicle are being used for which purposes and the software instructs the adaptive cable to configure itself to make the correct connections so that the scan tool can communicate properly with the vehicle.

A power controller 412 controls the power supplied to adaptive cable. As noted above, the adaptive cable can be powered through the J1962 (Vbat) connection. The power controller can also regulate the power that is provided to the communication protocol module 408 so that the appropriate power is supplied to the communication protocol circuits (transmitter and receiver). Different communication protocol circuits require different power and thus, the power from the Vbat must be regulated to ensure the right power is provided depending on the communication protocol being used.

The J1962 connector 414 connects the adaptive cable to the DLC. A second multiplexer circuit 418 is also provided to cover additional communication protocols that will be needed in the future or were not able to fit in the multiplexer 410. The second multiplexer includes the FETs, relays and other components to perform the required multiplexing task. New vehicle I/O circuits 420 provide additional circuits not already built into the multiplexer 410. Where protection is needed, appropriate I/O protection circuits 406, 416 are provided. The main PCB is designed to support the expansion card, the communication protocol module, the multiplexers, the V I/O, and I/O protection circuits thereon. However, the main PCB can have more or less components, thereon as needed.

Figure 5:
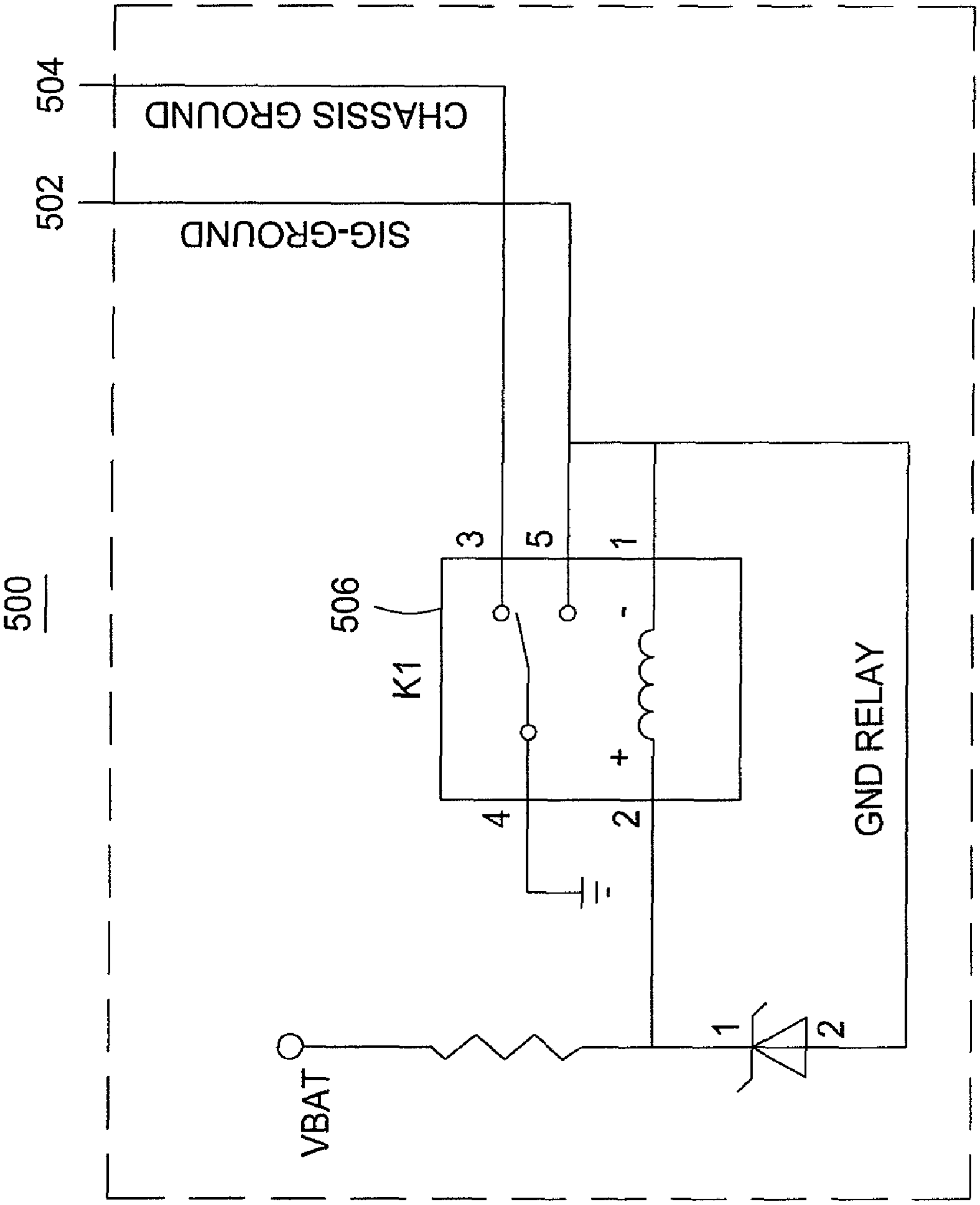
FIG. 5 is a schematic diagram of a relay circuit according to an embodiment of the invention.

FIG. 5 is a schematic diagram 500 of a relay circuit according to an embodiment of the invention. As stated above, vehicles can have two grounds, the signal ground 502 and chassis ground 504. These grounds provide the reference signal that the scan tool needs to correctly decipher the signals it collects from the vehicles. Otherwise, the signals from the vehicle may float and accurate measurements are hard to make by the scan tool. However, not all vehicles provide both grounds through the J1962 connector. The vehicle under test may provide one or the other ground and not both grounds. The scan tool will usually look for the signal from the signal ground to see if it is present. However, when the signal ground is not present, the scan tool may not look for a signal from the chassis ground until it is instructed to do so by the user.

The adaptive cable is provided with a relay 506 that can be energized to switch from one ground to another. The relay can be positioned between the signal ground 502 and chassis ground 504 connections. The relay can be configured to switch to the ground that is active in the J1962 connector. For example, the relay can be energized to automatically switch from the signal ground to the chassis ground when no signal is detected from the signal ground but a signal is present on the chassis ground. Thus, the scan tool can always have a ground signal as a reference signal regardless of the vehicle under test.

In operation, the user can enter information about the vehicle under test into the scan tool or the scan tool can automatically detect. The information can include VIN, make, year, model and other vehicle information. Based on the information, the scan tool can send a signal to the adaptive cable to configure the multiplexer to make the correct connections with the connections on the DLC. The scan tool includes data for every make and model so that the scan tool can configure the adaptive cable for the correct connections. This can be done automatically without the user having to find the correct SSI cards or keys and insert them into the cable. By having an adaptive cable, the technician can quickly diagnose the vehicle instead of determining the correct SSI cards or keys for the vehicle and then wander around the garage to find them.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. An adaptive cable for use with a vehicle diagnostic tool, comprising:

a complex programmable logic device adapted to receive instructions from the vehicle diagnostic tool;

a first multiplexer adapted to receive instructions from the complex programmable logic device to configure its connections for a vehicle communication protocol;

a first cable to connect the adaptive cable to the vehicle diagnostic tool at a first end and to communicate with the complex programmable logic device at a second end;

a second cable to connect to a data link connector in a vehicle at a first end and to communicate with the first multiplexer at a second end;

a communication protocol module that communicates in various communication protocols and communicates with the multiplexer; and a housing that houses the first multiplexer, a portion of the first cable, a portion of the second cable, the communication protocol module and the complex programmable logic device.

2. The adaptive cable of claim 1 further comprising:

a second multiplexer adapted to receive instructions from the complex programmable logic device to configure its connections for the vehicle communication protocol;

a vehicle input output adapted to receive instructions from the complex programmable logic device; and an expansion card received within a recess of the housing.

3. The adaptive cable of claim 2, wherein the second multiplexer communicates directly with the second cable.

4. The adaptive cable of claim 1 further comprising:

an expansion card received within a recess of the housing; and a power regulator to regulate the power within the adaptive cable.

5. The adaptive cable of claim 4, wherein the expansion card includes FETs, relays and communication protocol transmitters and receivers.

6. The adaptive cable of claim 1, wherein the first multiplexer, communication protocol module and the complex programmable logic device are in communication with each other and are positioned on a printed circuit board (PCB).

7. The adaptive cable of claim 1 further comprising an expansion card adapted to be received in a recess of the housing and provides additional communication protocols and processing to the adaptive cable.

8. A method of providing communication between a vehicle diagnostic tool and a vehicle data link connector, comprising:

receiving communication protocol instructions from the vehicle diagnostic tool sent to a complex programmable logic device via a first cable;

sending configuration instructions from the complex programmable logic device to a first multiplexer, wherein the first multiplexer configures its connectors based on the communication protocol of a vehicle under test; and providing communication between the vehicle diagnostic tool and the vehicle data link connector with a communication protocol module, and the first multiplexer via a second cable connected to the vehicle data link connector.

9. The method of claim 8 further comprising:

expanding the communication between the vehicle diagnostic tool and the data link connector via an expansion card received within a housing of an adaptive tool.

10. The method of claim 8 further comprising:

expanding the communication between the vehicle diagnostic cable and the data link connector with a second multiplexer; and controlling a power within an adaptive cable with a power regulator.

11. The method of claim 8, wherein the communication protocol module includes transmitters and receivers to communicate in various communication protocols of the vehicle.

12. The method of claim 8, wherein the vehicle diagnostic tool receives vehicle information inputted by a user.

13. The method of claim 8, wherein the diagnostic tool receives vehicle information by linking with the vehicle data link connector.

14. An adaptive cable for use with a vehicle diagnostic tool, comprising:

a means for processing to receive instructions from the vehicle diagnostic tool;

a first means for multiplexing to receive instructions from the means for processing to configure its connections for a vehicle communication protocol;

a first means for transmitting to connect the adaptive cable to the vehicle diagnostic tool;

a second means for transmitting to connect the adaptive cable to a data link connector in a vehicle;

a means for communicating in various communication protocols with the first means for multiplexing; and a means for housing the first means for multiplexing, a portion of the first means for transmitting, a portion of the second means for transmitting, the means for communicating and the means for processing.

15. The adaptive cable of claim 14 further comprising:

a second means for multiplexing to receive instructions from the means for processing to configure its connections for the vehicle communication protocol;

a means for inputting and outputting to receive instructions from the means for processing; and a means for expanding received within a recess of the means for housing.

16. The adaptive cable of claim 14 further comprising:

a means for expanding received within a recess of the means for housing; and a means for regulating power to regulate a power within the adaptive cable.

17. The adaptive cable of claim 16, wherein the means for expanding includes FETs, relays and communication protocol transmitters and receivers.

18. The adaptive cable of claim 14, wherein the first means for multiplexing, the means for communicating and the means for processing are in communication with each other and are positioned on a PCB.

19. The adaptive cable of claim 14 further comprising a means for expanding received in a recess of the means for housing and provides additional communication protocols and processing to the adaptive cable.

20. The adaptive cable of claim 15, wherein the second means for multiplexing communicates directly with the second means for transmitting.

* * * * *